United States Patent
Jerabek et al.

[11] Patent Number: 6,084,766
[45] Date of Patent: Jul. 4, 2000

[54] METHOD OF MAKING AN ULTRACAPACITOR ELECTRODE

[75] Inventors: Elihu Calvin Jerabek, Glenmont; Sean Francis Mansfield, Saratoga Springs, both of N.Y.

[73] Assignee: General Electric Company, Schenectady, N.Y.

[21] Appl. No.: 09/162,526

[22] Filed: Sep. 29, 1998

[51] Int. Cl.[7] .................. H01G 9/00; H01G 9/02
[52] U.S. Cl. .............. 361/502; 361/512; 361/504; 427/79
[58] Field of Search .................. 361/502, 508, 361/512, 516, 518, 521, 526, 528, 532, 536; 427/79; 29/25.03

[56] References Cited

U.S. PATENT DOCUMENTS

| | | | |
|---|---|---|---|
| 4,000,006 | 12/1976 | Trocciola et al. | 427/115 |
| 4,352,147 | 9/1982 | Elias et al. | 361/502 |
| 4,803,597 | 2/1989 | Watanabe et al. | 361/502 |
| 5,136,472 | 8/1992 | Tsuchiya et al. | 361/502 |
| 5,150,283 | 9/1992 | Yoshida et al. | 361/502 |
| 5,390,595 | 2/1995 | Cutcher | 101/128.21 |
| 5,420,747 | 5/1995 | Ivanov et al. | 361/502 |
| 5,464,453 | 11/1995 | Tong et al. | 29/25.03 |
| 5,611,339 | 3/1997 | Okabe et al. | 600/372 |
| 5,726,856 | 3/1998 | King, Jr. et al. | 361/505 |
| 5,786,980 | 7/1998 | Evans | 361/502 |
| 5,859,761 | 1/1999 | Aoki et al. | 361/502 |

FOREIGN PATENT DOCUMENTS 11486  4/1996  WIPO.

OTHER PUBLICATIONS

"Mobility and Ionic Association of Lithium Salts in a Propylene Carbonate–Ethyl Methyl Carbonate Mixed Solvent", Ue & Mori, Electrochem. Soc., vol. 142, No. 8, Aug. 1995.

*Primary Examiner*—Kristine Kincaid
*Assistant Examiner*—Anthony Dinkins
*Attorney, Agent, or Firm*—Noreen C. Johnson; Douglas E. Stoner

[57] ABSTRACT

A film-forming paste is applied to a substrate through a screen at least in part supported by raised spaced ribs to fill spacing on the substrate defined by the ribs. The film is then cured to form a patterned electrode with intervening spacing for accumulation of gas during operation of the electrode in an ultracapacitor.

27 Claims, 6 Drawing Sheets

METHOD OF MAKING AN ULTRACAPACITOR ELECTRODE

This invention was made with government support under Contract No. 38-83CH10093 awarded by DOE. The government may have certain rights in the invention.

BACKGROUND OF THE INVENTION

Capacitors are storage devices that store electrical energy on an electrode surface. Electrochemical cells create an electrical charge at electrodes by chemical reaction. The ability to store or create electrical charge is a function of electrode surface area in both applications. Ultracapacitors, sometimes referred to as double layer capacitors, are a third type of storage device. An ultracapacitor creates and stores energy by microscopic charge separation at an electrical chemical interface between electrode and electrolyte.

Ultracapacitors are able to store more energy per weight than traditional capacitors and they typically deliver the energy at a higher power rating than many rechargeable batteries. Ultracapacitors comprise two porous electrodes that are isolated from electrical contact by a porous separator. The separator and the electrodes are impregnated with an electrolytic solution, which allows ionic current to flow between the electrodes while preventing electronic current from discharging the cell. Each electrode is in intimate contact with a current collector. One purpose of the current collector is to reduce ohmic loss. If the current collectors are nonporous, they can also be used as part of the capacitor case and seal.

When electric potential is applied to an ultracapacitor cell, ionic current flows due to the attraction of anions to the positive electrode and cations to the negative electrode. Upon reaching the electrode surface, the ionic charge accumulates to create a layer at the solid liquid interface region. This is accomplished by absorption of the charge species themselves and by realignment of dipoles of the solvent molecule. The absorbed charge is held in this region by opposite charges in the solid electrode to generate an electrode potential. This potential increases in a generally linear fashion with the quantity of charge species or ions stored on the electrode surfaces. During discharge, the electrode potential or voltage that exists across the ultracapacitor electrodes causes ionic current to flow as anions are discharged from the surface of the positive electrode and cations are discharged from the surface of the negative electrode while an electronic current flows through an external circuit between electrode current collectors.

In summary, the ultracapacitor stores energy by separation of positive and negative charges at the interface between electrode and electrolyte. An electrical double layer at this location consists of sorbed ions on the electrode as well as solvated ions. Proximity between the electrodes and solvated ions is limited by a separation sheath to create positive and negative charges separated by a distance which produces a true capacitance in the electrical sense.

During use, an ultracapacitor cell is discharged by connecting the electrical connectors to an electrical device such as a portable radio, an electric motor, light emitting diode or other electrical device. The ultracapacitor is not a primary cell but can be recharged. The process of charging and discharging may be repeated over and over. For example, after discharging an ultracapacitor by powering an electrical device, the ultracapacitor can be recharged by supplying potential to the connectors.

The physical processes involved in energy storage in an ultracapacitor are distinctly different from the electrochemical oxidation/reduction processes responsible for charge storage in batteries. Further unlike parallel plate capacitors, ultracapacitors store charge at an atomic level between electrode and electrolyte. The double layer charge storage mechanism of an ultracapacitor is highly efficient and can produce high specific capacitance, up to several hundred Farads per cubic centimeter.

Undesirable gas is generated in an ultracapacitor by a variety of mechanisms. First, water that is present within a sealed ultracapacitor component can be electrolyzed as the cell voltage rises above about 1.2 volts. Electrolyzing water produces oxygen gas and hydrogen gas. Additionally, gas can be generated from desorption from the carbon electrodes or from decomposition of electrolyte impurities. Gas in the ultracapacitor is undesirable for a number of reasons. A major reason is that the gas resides within pores of the carbon electrode or separator to increase electrical resistance.

The present invention relates to a method of preparing a nonaqueous ultracapacitor cell and particularly to a method for printing to provide an electrode that lessens substantially the adverse effect of gas produced within an ultracapacitor.

The method of producing the electrode according to the present invention is advantageous in another respect. The method is a screen printing method. Heretofore, screen printing methods were restricted to electrodes of about 6 inches or less on a side because larger electrodes would cause the printing screen to deform from the weight of the screen printing wiper blade. Screen deformation results in an unequal application of electrode material. The present invention overcomes this deficiency in the art as well as the problem of gas accumulation.

SUMMARY OF THE INVENTION

In the method of the invention, a film-forming paste is applied to a substrate through a screen at least in part supported by raised spaced ribs to fill area on the substrate defined by the ribs. The film is then cured to form a patterned electrode with intervening spacing for accumulation of gas during operation of the electrode in an ultracapacitor.

The invention also relates to a method of making an ultracapacitor. In the method, a multilayer cell is provided that comprises two solid, nonporous current collectors, two porous electrodes separating the current collectors; a porous separator between the electrodes and an electrolyte occupying pores in the electrodes and separator. At least one of the porous electrodes is produced by applying a film-forming paste to a substrate through a screen at least in part supported by raised spaced ribs to fill spacing on the substrate defined by the ribs and curing the film to form a patterned electrode with intervening spacing. The cell is then sealed to form an ultracapacitor.

In another aspect, the invention relates to a method of making a stack of ultracapacitor cells, comprising providing in stacked relationship, a plurality of bipolar double layer ultracapacitor cells, at least one comprising porous, oppositely charged electrodes with ionically charged separator disposed between the electrodes, wherein at least one electrode is produced by applying a film-forming paste to a substrate through a screen at least in part supported by raised spaced ribs to fill spacing on the substrate defined by the ribs and curing the film to form a patterned electrode with intervening spacing. A non-porous current collector is then provided between each cell with each current collector having adjoining polarized electrodes of different cells bonded thereto. The electrodes and separators are saturated with electrolyte and the cells, current collectors and separators are sealed to form the stack of ultracapacitor cells.

In another aspect, an electrode of an ultracapacitor, comprises a substrate and a printed electrode film having matrix patterned spacings for accumulation of gas during operation of the electrode in an ultracapacitor. In still another aspect, the electrode is produced by a method comprising applying a film-forming paste to a substrate through a screen at least in part supported by raised spaced ribs to fill spacing on the substrate defined by the ribs; and curing the film forming paste to form a patterned electrode. In a final aspect, the invention relates to a stack of ultracapacitor cells, wherein at least one of the cells comprises an electrode comprising a substrate and a printed electrode film having matrix patterned spacings for accumulation of gas during operation of the electrode in an ultracapacitor.

DETAILED DESCRIPTION OF THE INVENTION

Figure 1:
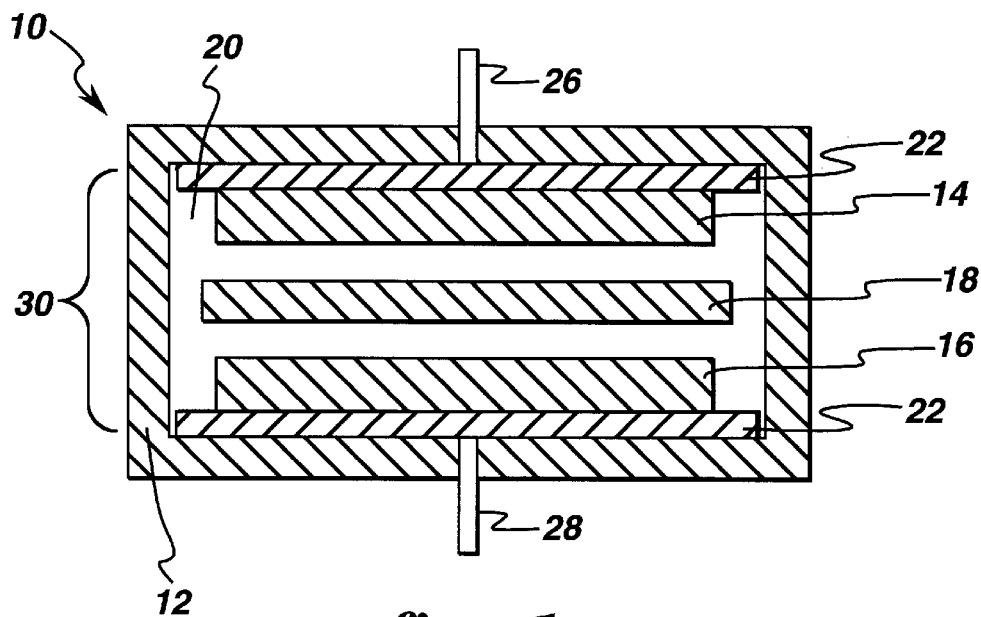
FIG. 1 is a front sectional view of an ultracapacitor.
Figure 2:
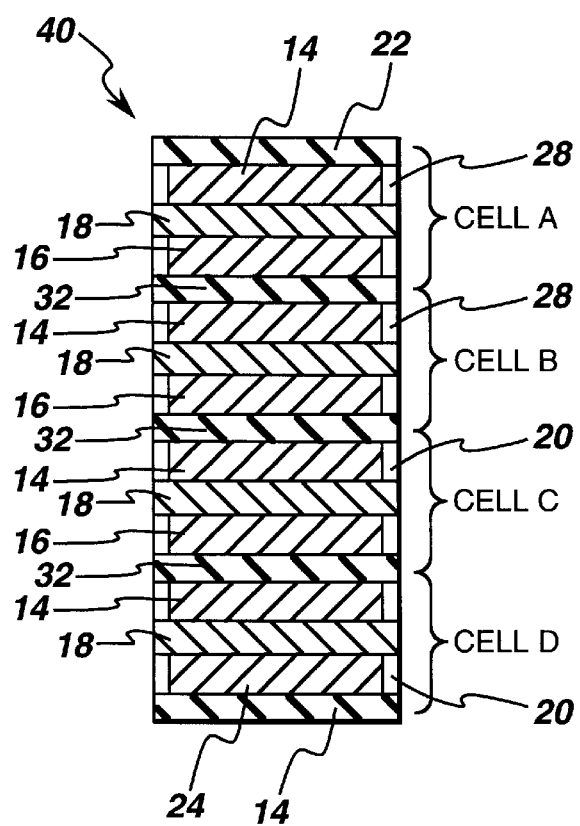
FIG. 2 is a front sectional view of a series stack of ultracapacitor cells.

The electrode of the invention can be used in a wide variety of ultracapacitors such as described in U.S. Pat. No. 5,464,453; 5,420,747; 5,150,283; 5,136,472; and 4,803,597; as well as PCT Application WO96/11486 (PCT/US95/12772; Apr. 18, 1996), all of which are incorporated herein by reference. FIGS. 1 and 2 herein, are based on PCT Application WO96/11486 and show a non-limiting examples of a electrodes made by the method of the present invention.

In all of the Figures of this application, like structures are identified by the same numbers.

Referring to FIG.1, ultracapacitor 10 includes a nonconductive enclosing body 12, a pair of carbon electrodes 14 and 16, an electronic porous separator layer 18, an electrolyte 20, a pair of conductive layers which are current collectors 22 and 24 and electrical leads 26 and 28, extending from the current collectors 22 and 24. One of the pair of current collectors 22 and 24 is attached to the back of each electrode 14 and 16. In FIG. 1, electrodes 14 and 16 can each represent a plurality of electrodes so long as the electrodes are porous to electrolyte flow.

The current collectors 22, 24 commonly are made of aluminum because of its conductivity and cost. In the drawings, the current collectors 22 and 24 are thin layers of aluminum foil. However, the electrodes can be any suitable conductive material.

The electronic separator 18 is preferably made from a highly porous material which acts as an electronic insulator between the carbon electrodes 14 and 16. The separator 18 assures that opposing electrodes 14 and 16 are never in contact with one another. Contact between electrodes can result in a short circuit and rapid depletion of the charges stored in the electrodes. The porous nature of the separator 18 allows movement of ions in the electrolyte 20. A wide variety of types and arrangements of separation layers can be employed, as those of ordinary skill in the electrochemical arts realize. Separation layers are usually made from nonconductive materials such as cellulosic materials; glass fiber; polymers such as polyesters or polyolefins; and the like. In those embodiments in which the separator layers will be in contact with sealant material, they should have a porosity sufficient to permit the passage of sealant and should be resistant to the chemical components in the sealant. In a typical ultracapacitor, the separator layers have a thickness in the range of about 0.5 mil to about 10 mils. Preferred separators 18 are porous polypropylene and tissue cellulosic materials.

Exemplary organic solvents for electrolyte 20 include but are not limited to nitriles such as acetonitrile, acrylonitrile and propionitrile; sulfoxides such as dimethyl, diethyl, ethyl methyl and benzylmethyl sulfoxide; amides such as dimethyl formamide and pyrrolidones such as N-methylpyrrolidone. Preferably, the electrolyte 20 includes a polar aprotic organic solvent such as a cyclic ester, chain carbonate, cyclic carbonate, chain ether and/or cyclic ether solvent and a salt. Preferred cyclic esters are esters having 3 to 8 carbon atoms. Examples of the cyclic esters include β-butyrolactone, γ-butyrolactone, γ-valerolactone and δ-valerolactone. The chain carbonates are preferred to be carbonates having 3 to 8 carbon atoms. Examples of the chain carbonates include dimethyl carbonate, diethyl carbonate, dipropyl carbonate, methyl ethyl carbonate, methyl propyl carbonate and ethyl propyl carbonate. The preferred cyclic carbonates have 5 to 8 carbon atoms. Examples of the cyclic carbonates include 1,2-butylene carbonate, 2,3-butylene carbonate, 1,2-pentene carbonate, 2,3-pentene carbonate and propylene carbonate. The preferred chain ethers have 4 to 8 carbon atoms. Examples of the chain ethers include dimethoxyethane, diethoxyethane, methoxyethoxyethane, dibutoxyethane, dimethoxypropane, diethoxypropane and methoxyethoxypropnane. The preferred cyclic ethers have 3 to 8 carbon atoms. Examples of the cyclic ethers include tetrahydofuran, 2-methyl-tetrahydrofuran, 1,3-dioxolan, 1,2-dioxolan, 2-methyldioxolan and 4-methyl-dioxolan.

Suitable electrolyte salts include quaternary ammonium salts such as tetraethylammonium tetraflouroborate ((Et)$_4$NBF$_4$), hexasubstituted guanidinium salts such as disclosed ((Et)$_4$NBF$_4$), hexasubstituted guanidinium salts such as disclosed in U.S. Pat. No. 5,726,856, the disclosure of which is incorporated herein by reference, and lithium salts such as disclosed by Ue et al., Mobility and Ionic Association of Lithium Salts in a Propylene Carbonate-Ethyl Carbonate Mixed Solvent, *Electrochem. Soc.*, vol. 142, No. 8, August 1995, the disclosure of which is incorporated herein by reference.

One or both of the electrodes 14,16 is a characterized by matrix spacing for the accumulation of gas and is produced by the method of the present invention. In a preferred embodiment, the electrodes 14,16 in FIG. 1, are both carbon electrodes on aluminum current collectors.

The enclosing body 12 can be any known enclosure means commonly used with ultracapacitors. It is an advantage to minimize the weight of the packaging means to maximize the energy density of the ultracapacitor. Packaged ultracapacitors are typically expected to weigh 1.25 to 2 times more than the unpackaged ultracapacitor. The electrical leads 26 and 28 extend from the current collectors 22 and 24 through the enclosing body 12 and are adapted for connection with an electrical circuit (not shown).

Ultracapacitor 10 of FIG. 1 includes a bipolar double layer cell 30 that includes two solid, nonporous current collectors 22, 24, two porous electrodes 14, 16 separating the current collectors 22, 24 and a porous separator 18 between the electrodes 14, 16 and an electrolyte 20 occupying pores in the electrodes 14, 16 and separator 18. Individual ultracapacitor cells can be stacked in series to increase operating voltage. The optimum design is to have adjacent cells separated with only a single current collector. This collector is non-porous so that no electrolytic solution is shared between cells. This type of design is called bipolar and is illustrated in FIG. 2 of the drawings. In a bipolar double layer capacitor, one side of the current collector contacts a positive electrode and the other side contacts a negative electrode of an adjacent cell. A series stack 40 of the high performance bipolar double layer cells 30 (A, B, C and D) is illustrated in FIG. 2. In FIG. 2, each pair of polarized carbon electrodes, 14, 16 is separated with a separator 18. A current collector 32 is attached at one surface to charged electrode 14 of a first cell. Attached to an opposite surface of the current collector 32, is an oppositely charged electrode 16 of a second cell. If one side of the current collector 32 is in contact with the negative electrode for a first capacitor cell "A," then the other side of the same current collector 32 is in contact with a positive electrode for an adjacent cell "B." A sufficient amount of an electrolyte 20 is introduced such that the electrolyte 20 saturates the electrodes 14 and 16 and separator 18 within each cell. Exterior current collectors 22 and 24 are placed at each end of the stack.

The internal current collectors 32 of the series stack of cells are preferably nonporous layers of aluminum foil designed to separate the electrolyte 20 between adjacent cells. The exterior current collectors are also nonporous such that they can be used as part of the external capacitor case seal, if necessary. The electronic separator 18 is located between the opposing carbon electrodes 14 and 16 within a particular capacitor cell. The electronic separator 18 allows ionic conduction via charged ions in the electrolyte.

The ultracapacitor cell can be constructed by placing the layers of conductor, electrode and separator along with electrolyte within an enclosing body. The structure can then be subjected to pressure to seal the layers within the enclosing body. Alternatively, the enclosing body can be subjected to pressure and vacuum. The vacuum acts to remove gases while the ultracapacitor is sealed. Alternatively, the ultracapacitor cell can be constructed by providing adhesive between layers and applying pressure and or heat throughout the adhesive to seal the cell.

Figure 3:
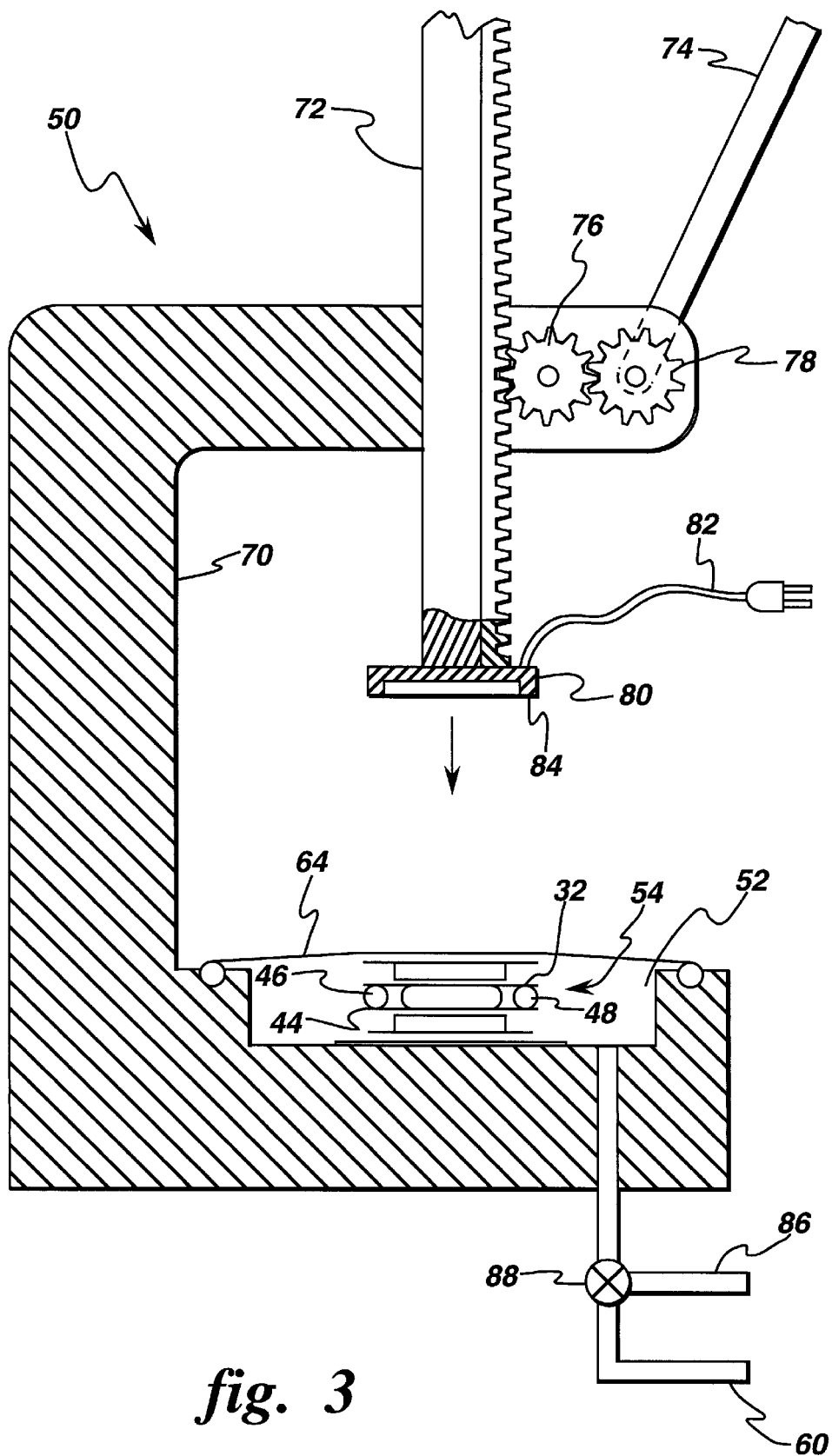
FIG. 3 is a cross-sectional view of an exemplary apparatus for sealing an ultracapacitor.

FIG. 3 depicts one, non-limiting illustration of an apparatus and method of sealing an ultracapacitor or series stack of ultracapacitor cells according to the present invention. Referring to FIG. 3, structure 50 is a frame, platform, or other construction but is often a press as described below. An enclosable region is depicted in FIG. 3 as recess 52, in which an ultracapacitor series stack 40 is disposed. The embodiment illustrated in FIG. 3 permits application of vacuum while the ultracapacitor is being sealed. Primary vacuum tube 60 communicates with recess 52. A collapsible membrane 64 can be fastened over the ultracapacitor to maintain a vacuum while the cell is being sealed by pressing.

Figure 4:
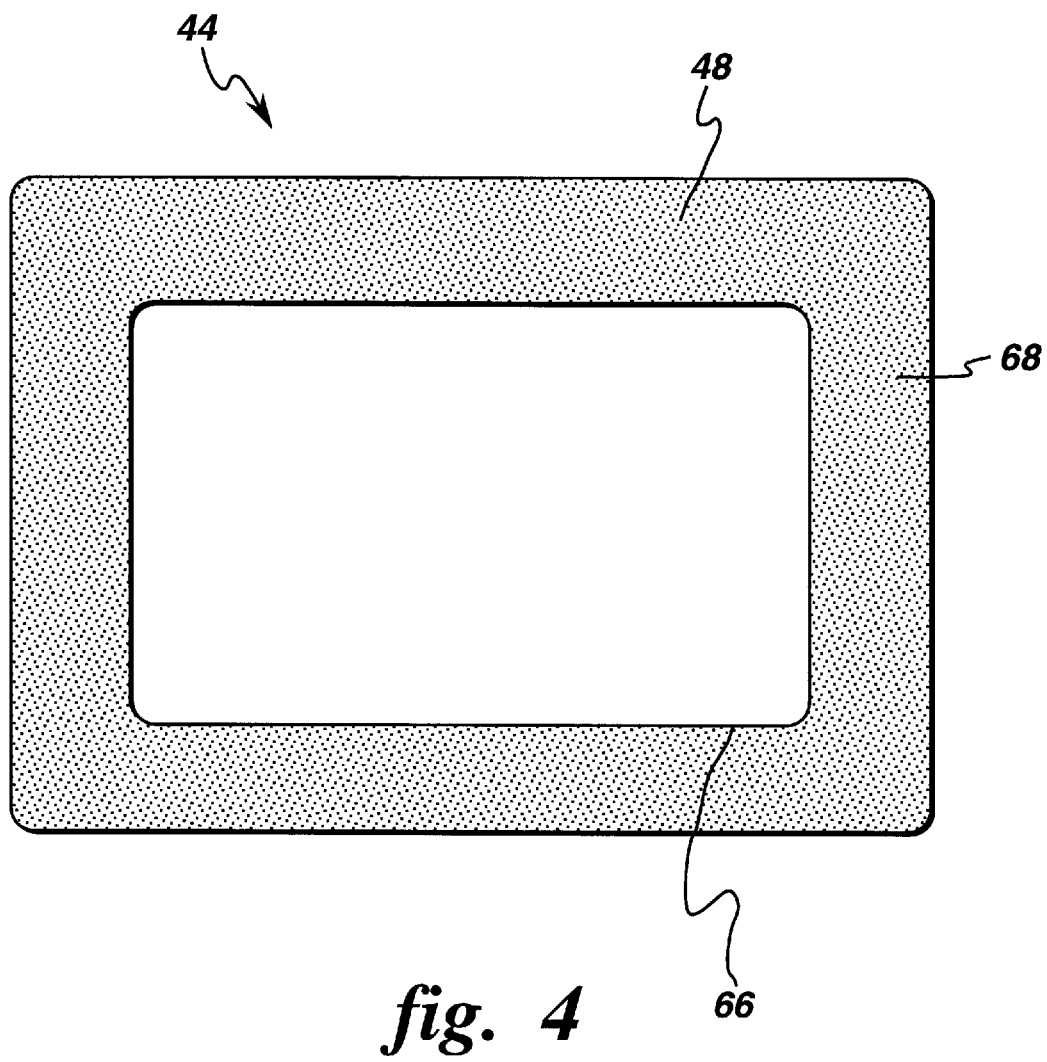
FIG. 4 is a top cross-sectional view of a separator of a sealed ultracapacitor
Figure 5:
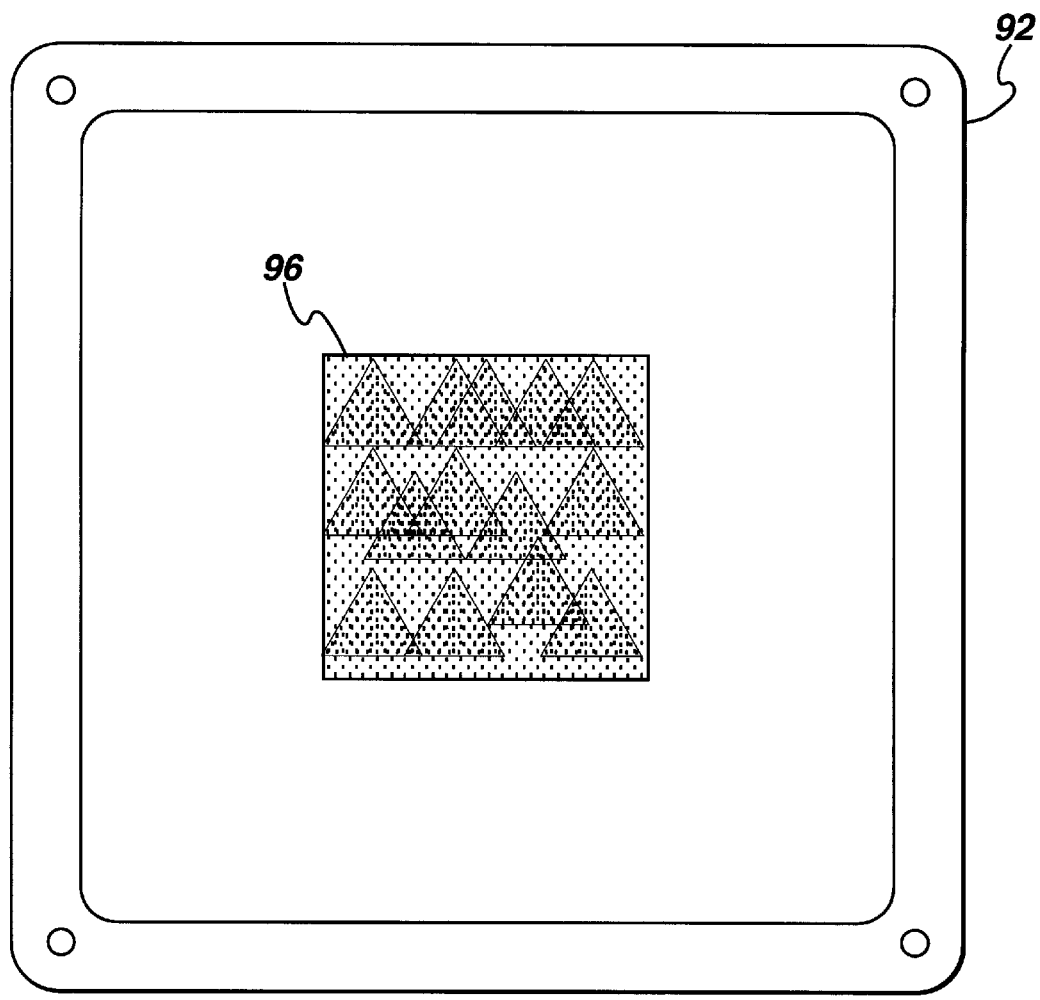
FIG. 5 is a top view of a mounting frame and printing area for printing an electrode.
Figure 6:
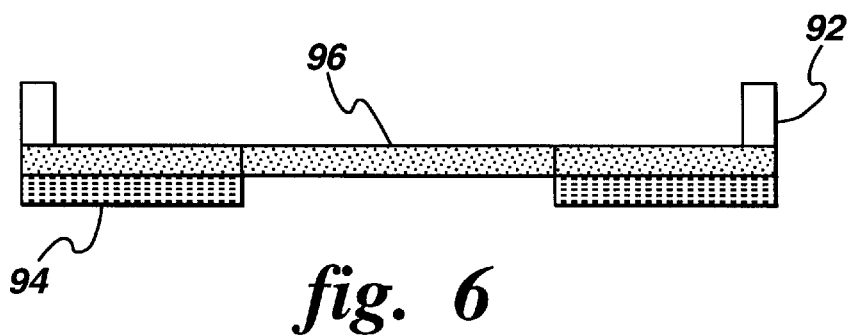
FIG. 6 is a side view of a mounting frame and printing area.

FIG. 3 shows an ultracapacitor cell disposed in the recess area of the press 50. The cell includes a separator system, comprising an upper separator layer 42 and a lower separator layer 44. Sealant portions 46 and 48 are disposed in a peripheral area between the bottom surface of separator 42 and the top surface of separator 44. "Peripheral" refers to the boundary area of the separator layers. In general, this area should be as small as possible. This boundary area is designated as element 68 in FIG. 4. FIG. 4 provides a top, cross-sectional view of a separator layer similar to layer 44 of FIG. 3, after sealant has spread to some extent by the action of pressure and, optionally, heat, as described below. The boundary area 68 surrounds the primary section 66 of a separator layer.

Many different types of sealants can be used in the present invention and the term is meant to encompass, "glues", or "pastes." Sealants are described, for example, in the Kirk-Othmer *Encyclopedia of Chemical Technology*, 3rd Edition, Vol.1, pp. 488–508 (1978), and in *The Condensed Chemical Dictionary*, 10th Edition, 1981, Van Nostrand Reinhold Company. In general, the selected sealant should be chemically resistant to electrolyte. It should also be capable of withstanding operating temperatures of the ultracapacitor without substantial degradation. Moreover in those embodiments where the sealant contacts the separators, it should be capable of flowing through the thickness of the separator layers. Once cured, the sealant should be substantially impermeable to the flow or passage of electrolyte.

Heat-curable sealants may be used in some embodiments. Moisture-cured sealants or externally-cured materials may be used. Other embodiments may use air-curable or pressure-sensitive sealants, such as "hot melt" glues. Illustrative sealants include those based on acrylic, ethylene such as ethylene vinyl acetate (EVA) copolymer, silicone, rubber, epoxy materials, or combinations of these materials. Commercial examples include the materials commonly referred to as "hot glues."

The sealants are usually in the form of liquids, pastes, or solids. A sealant may be applied to one or both of the facing surfaces of the separators or other surfaces. Many techniques are available for applying sealant. Known application techniques include the use of a spatula, brush, roller, spray, or glue gun. As one example, a bead, strip or "ring" of sealant is applied along the peripheral area 68 of one of the separator layers. Alternatively, individual droplets of sealant can be deposited at sites in the peripheral area 68 with the droplets flowing and covering the peripheral area 68 upon the application of pressure, vacuum and/or heat. As yet another alternative, at least one of the separator layers 18 can be pre-impregnated with sealant. All of these techniques cause the sealant to form a continuous layer. In general, the particular method of deposition is not critical, as long as the sealant is applied to locations where it will eventually form a seal after pressure or vacuum is released. The ultracapacitor becomes sealed by a barrier which is perpendicular to the horizontal capacitor layers which are encased in the barrier.

A compressive force is applied to promote the flow of he sealant—especially in the case of sealant compositions with very high softening points or glass transition temperatures, such as the EVA based types. Compression can be applied indirectly to the sealant through upper ultracapacitor layers by means of the mechanical press 50 of FIG. 3. Other devices to seal an ultracapacitor include an hydraulic press or pneumatic press or any device for applying compressive force. The press 50 of FIG. 3 includes structural frame 70 and adjustable beam 72. The length of beam 72 moves in a direction perpendicular to the base portion of the structural frame as controlled by the selective action of hand lever 74 and gears 76 and 78. Compression element 80 is detachably attached as the base of beam 72. Bottom surface 82 can be similar in shape to the peripheral area of the top planar surface of ultracapacitor 40. The force applied by the press should be sufficient to cause the sealant to become substantially fluid, to flow and form a continuous bead or strip around the peripheral area of the layer on which it is deposited. Thus, the particular press force depends in large part on the nature of the sealant. In general, the pressure will be in the range of about 1 psi to about 1,000 psi and preferably, in the range of about 10 psi to about 100 psi. A lower press force will be suitable for lower viscosity sealants and a higher press force will be required for higher viscosity materials.

The sealant can be heated while being compressed. Heating enhances the flow characteristics of the sealant. Heating temperature should be sufficient to soften the sealant. Preferably, the temperature is high enough to melt the sealant. For a sealant made from an EVA based material, a suitable temperature will be in the range of about 100° C. to about 300° C.

Heat is applied to the sealant in the press 50 of FIG. 3 by means of a standard electrical heating element that is encased within element 80 and is connected to an electrical outlet by way of cord 82. The bottom surface 84 of element 80 has a shape that aligns with sealant-containing peripheral regions of ultracapacitor 10. Thus, when compression element 80 is lowered for compression of the ultracapacitor through membrane 64, heat is transmitted primarily to the sealant containing regions.

A vacuum can be applied to press together the layers of the ultracapacitor and to evacuate ambient gasses from the internal region of the cell structure. In FIG. 3, vacuum tube 60 is connected to a vacuum source through vacuum valve 88 with backfill vacuum tube 86. When vacuum is applied, the collapsible membrane 64 is positioned over recess 52. The membrane 64 maintains the vacuum within the recess and transmits the applied compressive force to the layers of the ultracapacitor. The membrane 64 is heat-resistant to a temperature of about 400° C. The amount of vacuum applied ranges from about 700 mm mercury to 0.1 mm mercury. A typical vacuum pressure is in the range of about 500 mm mercury to about 0.1 mm mercury.

In operation, the applied vacuum pressure draws collapsible membrane 64 tightly against the top of ultracapacitor 10, compressing the individual layers of the ultracapacitor against platform layer 58 while the action of compression element 80 presses against sealant-containing regions to induce sealant 46, 48 to permeate the peripheral regions of separator layers 18. The sealant contacts substantially aligned peripheral areas 60 of the facing surfaces of conductive layers 22 and 24. As the sealant cures or solidifies, it forms a strong bond to join layers 22 and 24. After sealing is complete, compression element 80 is retracted and the ultracapacitor is allowed to cool.

FIGS. 5–9, illustrate the preparation of an electrode according to the present invention. A screen printing frame 92 is shown. An emulsion coating 94 on the bottom of the mesh 96 usually rests on a substrate 98 to be coated. The emulsion thickness partly determines the resulting electrode thickness (deposit 100). A typical emulsion thickness is between 0.0005 inches and 0.020 inches. A preferred emulsion thickness for screen printing electrodes is 0.006 to 0.010 inches thick with a most preferred thickness being about 0.008 inches.

A printable carbon paste 106 is formulated by mixture of one part by weight of active carbon, which may or may not contain a highly conductive carbon black fraction, and about 2 parts by weight of liquid. The liquid portion may consist of any suitable solvent and dissolved salt which can become the ultracapacitor electrolyte, with or without a relatively high vapor pressure diluent. The liquid-to-solid ratio can be adjusted to suit rheological (printability) characteristics desired, however a typical range of liquid-to-solid ratio is between 1:1 and 3:1, with a preferred range between 1.8:1 and 2.5:1, and a most preferred range between 2:1 and 2.3:1.

Figure 7:
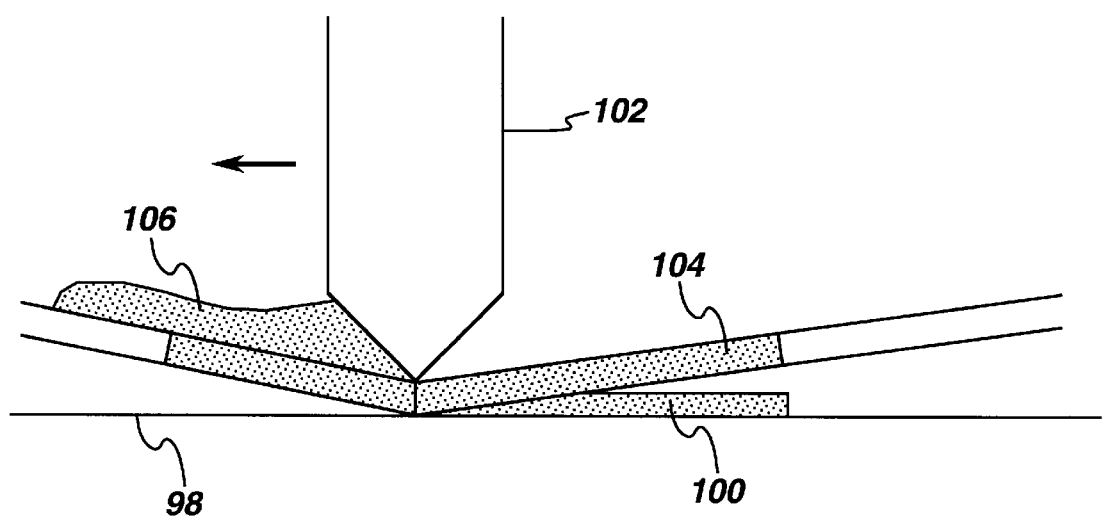
FIG. 7 is a side view of a screen and printing area, squeegee and carbon slurry during printing of an electrode.
Figure 8:
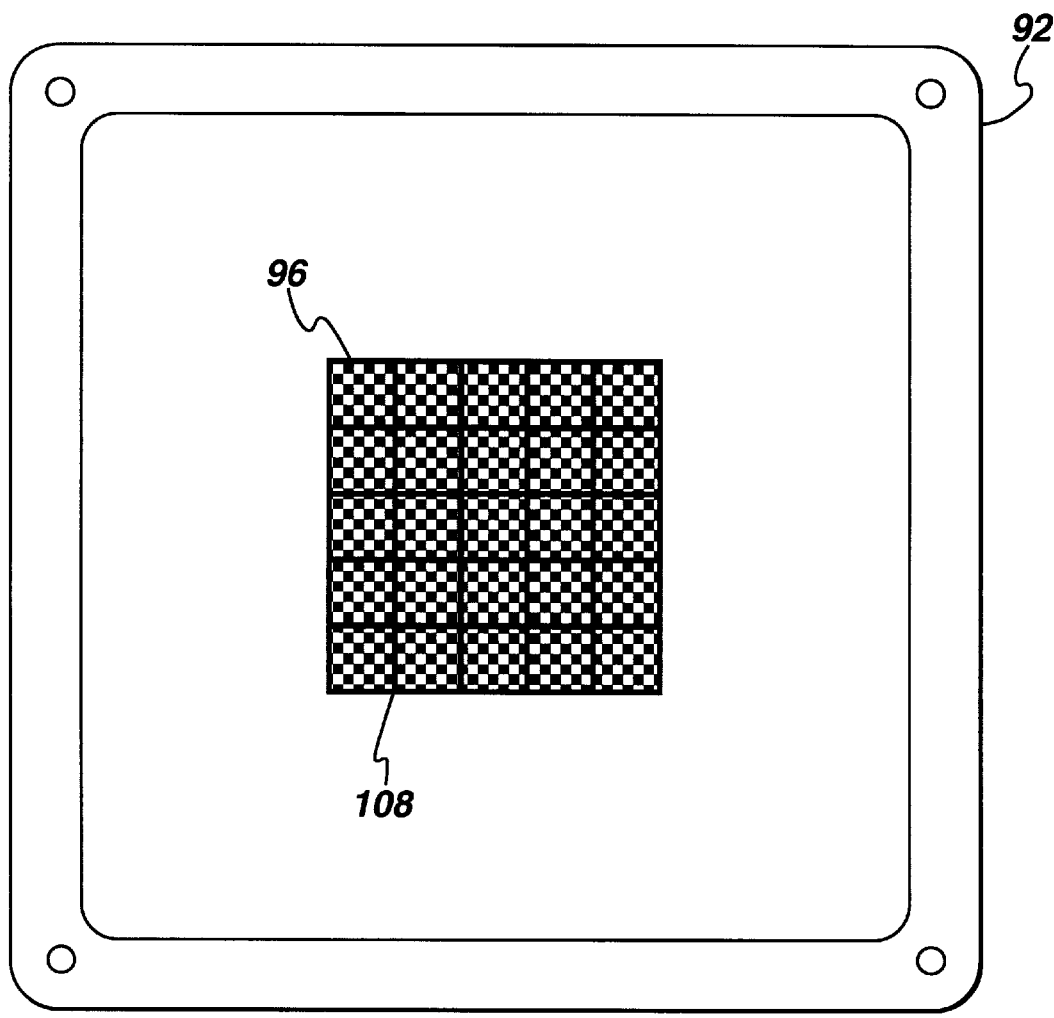
FIG. 8 is a top view of a mounting frame and printing area of the present invention.
Figure 9:
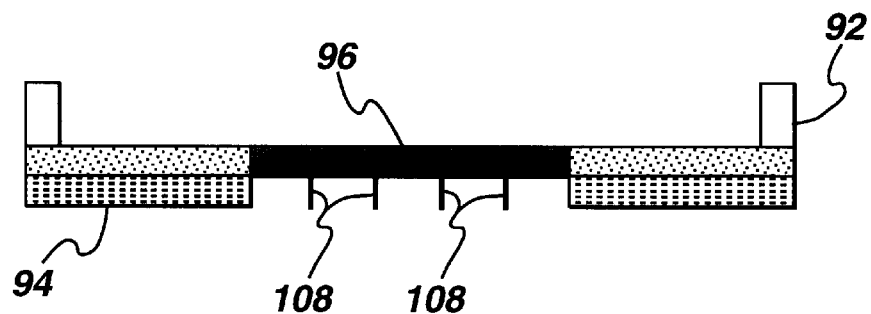
FIG. 9 is a side view of mounting frame and printing area according to the present invention.

The printing operation utilizes a squeegee 102 that is applied to press down on the mesh 96 from the top as the blade of the squeegee 102 wipes across open print area 104 to force "printable" paste 106 through mesh 96, as shown in FIG. 7. Downward pressure of squeegee 102 on mesh 96 causes some bowing distortion, which can reduce the amount of deposited paste 100 to cause a non-uniform coating. The speed of paste/slurry application by squeegee travel is adjustable. Typical speeds of travel are between 0.5 and 5 inches/second, with preferred speeds of 1–3 inches/second and a most preferred speed of about 1–2 inches/second. As illustrated in FIGS. 8 and 9, thin ribs 108 of emulsion are applied within the printed area to support mesh 96 during the wiping/printing process of the squeegee 102. The emulsion ribs 108 support the screen during printing to eliminate bowing and introduce non-deposited areas within the resulting electrode.

Electrodes can be made with supporting ribs in any appropriate layout to provide a spacing pattern that will accommodate the accumulation of gas during operation. For example, the spacing can be in an orthogonal layout, meaning supporting emulsion ribs 108 can be present in both the direction of squeegee travel and perpendicular to squeegee travel. Electrodes can also be constructed with ribs only in the direction of squeegee travel. The supporting emulsion rib 108 width can be varied as needed by reason of squeegee-load support, width of gas passage in the resulting electrode, or aspect ratio of rib width to electrode segment width.

The following examples are illustrative of the invention.

EXAMPLES

Segmented ultracapacitor electrodes were screen printed using an Aremco Model 3230 Semi-Automatic Screen Printer from Aremco Products, Inc., Ossining, N.Y. Screen printing frames 92, 15 inches by 15 inches in size were used with an emulsion thickness of 0.008 inches. Screen printing frames with and without emulsion were obtained from Utz Engineering Inc., East Clifton, N.J.

Segmented electrodes were made from printable areas 1 inch and 3.25 inches across, which resulted in electrode segments of nearly the same widths. Electrodes were made with supporting ribs in an orthogonal layout, meaning supporting emulsion ribs 108 were present in both the direction of squeegee travel and perpendicular to squeegee travel. Electrodes were also made with ribs only in the direction of squeegee travel. The fabricated electrodes had spaces formed from emulsion ribs of 0.050 inches in width. The ratio of rib width to electrode segment width was 1:19 in the case of 1 inch electrode segments and 1:64 in the case of 3.25 inch electrode segments. In the case of an orthogonal 1 inch design, the ribs occupied 7.84% of an overall 5 inch by 5 inch electrode. In the case of a 3.25 inch design. the ribs occupied 0.7692% of an overall 6.5 inch by 6.5 inch electrode.

The inclusion of supporting ribs under screen 96 decrease the total deflection of screen 96/emulsion 94 as squeegee 102 traverses printable area 104. Decreased deformation keeps the emulsion 94 in intimate contact with the substrate 98. This deters the liquid fraction of a paste/slurry from "creeping" between the emulsion 94 and substrate 98. Thus the non-deposited area of the substrate is cleaner after electrode printing when ribs are incorporated in the electrode width vs without ribs over the same total width electrode.

The non-deposited areas create "pores" which are orders of magnitude larger than the pores within the electrodes or separator materials. Gas migrates to these larger pores within the ultracapacitor cell while liquid is preferentially retained in the smaller pores of the electrode and separator. Additionally, the non-deposited areas of the electrode provide enhanced gas evacuation channels during application of vacuum during the sealing process.

Screen printed electrodes according to the invention, show lower resistance rise with use. Additionally, the method eliminates restrictions on printable electrode size by providing screen support during the printing process.

What is claimed:

1. A method of making an electrode of an ultracapacitor, comprising:
   (i) applying a film-forming paste to a substrate through a screen at least in part supported by raised spaced ribs to fill area on said substrate defined by said ribs; and (ii) curing said film forming paste to form a patterned electrode with intervening spacing for accumulation of gas during operation of said electrode in an ultracapacitor.

2. The method of claim 1, wherein said paste is applied through said screen by means of a squeegee.

3. The method of claim 2, wherein said raised spaced ribs comprise an orthogonal layout with said ribs present in both the direction of squeegee travel and perpendicular to the direction of squeegee travel.

4. The method of claim 2, wherein said raised spaced ribs comprise a layout with said ribs present solely in the direction of squeegee travel.

5. The method of claim 1, wherein said paste is characterized by a liquid to solids ratio of between about 1:1 and 3:1.

6. The method of claim 1, wherein said paste is characterized by a liquid to solids ratio of between about 1.8:1 and 2.5:1.

7. The method of claim 1, wherein said paste is characterized by a liquid to solids ratio of between about 2:1 and 2.3:1.

8. The method of claim 1, wherein said substrate is aluminum.

9. A method of making an ultracapacitor, comprising:
   (A) providing a multilayer cell comprising two solid, nonporous current collectors, two porous electrodes separating said current collectors; a porous separator between said electrodes and an electrolyte occupying pores in said electrodes and separator, wherein at least one of said porous electrodes is produced by the method of claim 1; and
   (B) sealing said cell to form said ultracapacitor.

10. The method of claim 9, wherein said paste is applied through said screen by means of a squeegee.

11. The method of claim 10, wherein said raised spaced ribs comprise an orthogonal layout with said ribs present in both the direction of squeegee travel and perpindicular to the direction of squeegee travel.

12. The method of claim 10, wherein said raised spaced ribs comprise a layout with said ribs present solely in the direction of squeegee travel.

13. The method of claim 9, wherein said paste is characterized by a liquid to solids ratio of between about 1:1 and 3:1.

14. The method of claim 9, wherein said paste is characterized by a liquid to solids ratio of between about 1.8:1 and 2.5:1.

15. The method of claim 9, wherein said paste is characterized by a liquid to solids ratio of between about 2:1 and 2.3:1.

16. The method of claim 9, wherein said substrate is aluminum.

17. A method of making a stack of ultracapacitor cells, comprising:
   (A) providing in stacked relationship, a plurality of bipolar double layer ultracapacitor cells, at least one comprising porous, oppositely charged electrodes with ionically charged separator disposed between said electrodes, wherein at least one cell is produced by the method of claim 1;
   (B) providing a non-porous current collector between each cell with each current collector having adjoining polarized electrodes of different cells bonded thereto;
   (C) saturating said electrodes and separators with electrolyte; and
   (D) sealing said cells, current collectors and separators to form said stack of ultracapacitor cells.

18. An electrode of an ultracapacitor, comprising a substrate and a printed film having spacings for accumulation of gas during operation of said electrode in an ultracapacitor.

19. The electrode of claim 18, wherein said spacing is in the form of a matrix pattern.

20. The electrode of claim 18, produced by a method comprising:
   (i) applying a film-forming paste to a substrate through a screen at least in part supported by raised spaced ribs to fill area on said substrate defined by said ribs; and (ii) curing said film forming paste to form a patterned electrode.

21. An ultracapacitor comprising at least one cell, said cell comprising; two solid, nonporous current collectors, two porous electrodes separating said current collectors, a porous separator between said electrodes and an electrolyte occupying pores in said electrodes and separator, wherein at least one of said electrodes comprises an electrode according to claim 18.

22. The ultracapacitor of claim 21, wherein said current collectors comprise aluminum.

23. The ultracapacitor of claim 21, wherein said separator is polypropylene or cellulosic tissue material.

24. The ultracapacitor of claim 21, wherein said electrolyte comprises a polar aprotic organic solvent and a quaternary ammonium salt, a hexasubstituted quanidium salt or a lithium salt.

25. The ultracapacitor of claim 21, wherein said electrolyte comprises $\gamma$-butyrolactone and tetraethylammonium tetraflouroborate.

26. The ultracapacitor of claim 21, comprising a plurality of electrodes separating said current collectors.

27. A stack of ultracapacitor cells, comprising at least one of the cells of claim 21.

* * * * *